(12) United States Patent
Lee et al.

(10) Patent No.: US 10,643,170 B2
(45) Date of Patent: May 5, 2020

(54) SYSTEMS, METHODS AND APPARATUS FOR DISTRIBUTION OF PRODUCTS AND SUPPLY CHAIN MANAGEMENT

(71) Applicant: Walmart Apollo, LLC, Bentonville, AR (US)

(72) Inventors: Ryan Lee, Bentonville, AR (US); Joseph Blackner, Bentonville, AR (US); Santos Cerda, Jr., Centerton, AR (US); Todd D. Mattingly, Bentonville, AR (US)

(73) Assignee: Walmart Apollo, LLC, Bentonville, AR (US)

(*) Notice: Subject to any disclaimer, the term of this patent is extended or adjusted under 35 U.S.C. 154(b) by 0 days.

(21) Appl. No.: 15/882,421

(22) Filed: Jan. 29, 2018

(65) Prior Publication Data

US 2018/0218247 A1    Aug. 2, 2018

Related U.S. Application Data

(60) Provisional application No. 62/452,058, filed on Jan. 30, 2017, provisional application No. 62/452,109, filed on Jan. 30, 2017.

(51) Int. Cl.
*G06Q 10/08* (2012.01)
*G02B 27/01* (2006.01)
(Continued)

(52) U.S. Cl.
CPC ....... *G06Q 10/0833* (2013.01); *G02B 27/017* (2013.01); *G05D 1/0088* (2013.01);
(Continued)

(58) Field of Classification Search
USPC .......................................... 235/385
See application file for complete search history.

(56) References Cited

U.S. PATENT DOCUMENTS 4,974,391 A * 12/1990 Blum ................. B65B 5/068
53/69
5,532,692 A    7/1996 Tatsuya
(Continued)

FOREIGN PATENT DOCUMENTS

CN       103018923 A    4/2013
WO       2000063805     10/2000
(Continued)

OTHER PUBLICATIONS

Heutger, M, et al.; "Logistics Trend Radar"; published 2016 by DHL Customer Solutions & Innovation; 55 pages.
(Continued)

*Primary Examiner* — Rafferty D Kelly
(74) *Attorney, Agent, or Firm* — Fitch, Even, Tabin & Flannery LLP

(57) ABSTRACT

In some embodiments, apparatuses and methods are provided herein useful to access and advance a work flow for a product or a plurality of products during unloading and loading shipments at a distribution center or unloading and processing shipments at a retail store. In some embodiments, RFID tags and wearable smart devices are employed such that products are monitored as they are unloaded from shipments at a retail facility, such as a distribution center, and repackaged into containers and onto a delivery truck for delivery to another retail facility, such as a physical retail store, or one or more customers.

27 Claims, 6 Drawing Sheets

(51) Int. Cl.

| | | |
|---|---|---|
| *G06K 7/10* | (2006.01) | |
| *G06K 17/00* | (2006.01) | |
| *G05D 1/00* | (2006.01) | |
| *G06K 9/00* | (2006.01) | |
| *G06Q 90/00* | (2006.01) | |
| *B65G 1/137* | (2006.01) | |
| *G06K 19/07* | (2006.01) | |
| *B65G 67/02* | (2006.01) | |

(52) U.S. Cl.
CPC ..... *G06K 7/10099* (2013.01); *G06K 7/10396* (2013.01); *G06K 9/00671* (2013.01); *G06K 17/0022* (2013.01); *G06K 17/0029* (2013.01); *G06Q 10/083* (2013.01); *G06Q 90/00* (2013.01); *B65G 1/137* (2013.01); *B65G 67/02* (2013.01); *G02B 2027/0138* (2013.01); *G02B 2027/0178* (2013.01); *G02B 2027/0187* (2013.01); *G06K 19/0723* (2013.01)

(56) References Cited

U.S. PATENT DOCUMENTS

| | | |
|---|---|---|
| 6,744,436 B1 | 6/2004 | Chirieleison |
| 7,201,316 B2 | 4/2007 | Anderson |
| 7,756,632 B2 | 7/2010 | Wise |
| 8,425,173 B2 | 4/2013 | Lert |
| 8,558,758 B2 | 10/2013 | Sato |
| 8,626,611 B2 | 1/2014 | Bravo |
| 8,756,165 B1 | 6/2014 | Haake |
| 9,024,842 B1 | 5/2015 | Prada Gomez |
| 9,151,953 B2 | 10/2015 | Qaddoura |
| 9,171,277 B2 | 10/2015 | Rutt |
| 9,171,278 B1 | 10/2015 | Kong |
| 9,342,610 B2 | 5/2016 | Liu |
| 9,477,888 B1 | 10/2016 | Lewis |
| 1,539,810 A1 | 1/2017 | High |
| 1,539,909 A1 | 1/2017 | High |
| 1,540,005 A1 | 1/2017 | High |
| 9,743,239 B1 | 8/2017 | Mishra |
| 1,588,242 A1 | 1/2018 | Lee |
| 1,588,252 A1 | 1/2018 | Lee |
| 1,593,975 A1 | 3/2018 | Lee |
| 1,030,401 A1 | 5/2019 | Lee |
| 2002/0050526 A1 | 5/2002 | Swartz |
| 2002/0062193 A1 | 5/2002 | Lin |
| 2002/0178074 A1 | 11/2002 | Bloom |
| 2003/0149644 A1 | 8/2003 | Stingel |
| 2003/0233165 A1 | 12/2003 | Hein |
| 2004/0015393 A1 | 1/2004 | Fong |
| 2004/0153379 A1 | 8/2004 | Joyce |
| 2004/0182925 A1 | 9/2004 | Anderson |
| 2004/0217166 A1 | 11/2004 | Myers |
| 2004/0243430 A1 | 12/2004 | Horstemeyer |
| 2005/0175441 A1 | 8/2005 | Liberman |
| 2006/0020366 A1 | 1/2006 | Bloom |
| 2006/0159307 A1* | 7/2006 | Anderson ................. B07C 3/20 382/101 |
| 2007/0013519 A1 | 1/2007 | Chung |
| 2007/0210937 A1 | 9/2007 | Smith |
| 2008/0040246 A1 | 2/2008 | Fukamachi |
| 2008/0131255 A1 | 6/2008 | Hessler |
| 2008/0312991 A1 | 12/2008 | Bharadwaj |
| 2009/0307096 A1 | 12/2009 | Antonellis |
| 2009/0313072 A1 | 12/2009 | Balok |
| 2010/0296908 A1 | 11/2010 | Ko |
| 2012/0150342 A1 | 6/2012 | Song |
| 2012/0212400 A1 | 8/2012 | Border |
| 2012/0212406 A1 | 8/2012 | Osterhout |
| 2012/0212414 A1 | 8/2012 | Osterhout |
| 2013/0050258 A1 | 2/2013 | Liu |
| 2013/0090757 A1 | 4/2013 | Phan |
| 2013/0141313 A1 | 6/2013 | Zhou |
| 2013/0233922 A1 | 9/2013 | Schoening |
| 2013/0278631 A1 | 10/2013 | Border |
| 2013/0290106 A1 | 10/2013 | Bradley |
| 2013/0346168 A1 | 12/2013 | Zhou |
| 2014/0019311 A1 | 1/2014 | Tanaka |
| 2014/0032360 A1 | 1/2014 | Nicholson |
| 2014/0102860 A1 | 4/2014 | Greyshock |
| 2014/0188270 A1 | 7/2014 | Stelzer |
| 2014/0207615 A1 | 7/2014 | Li |
| 2014/0214628 A1 | 7/2014 | Argue |
| 2014/0253868 A1* | 9/2014 | Jannard .................... G02C 9/04 351/158 |
| 2014/0257553 A1 | 9/2014 | Shakes |
| 2014/0267263 A1 | 9/2014 | Beckwith |
| 2014/0267399 A1 | 9/2014 | Zamer |
| 2014/0278627 A1 | 9/2014 | Grabovski |
| 2014/0279294 A1 | 9/2014 | Field-Darragh |
| 2014/0279660 A1 | 9/2014 | Santavicca |
| 2015/0039443 A1 | 2/2015 | Soon-Shiong |
| 2015/0058245 A1 | 2/2015 | Matthews |
| 2015/0088452 A1 | 3/2015 | Troxler |
| 2015/0088703 A1 | 3/2015 | Yan |
| 2015/0120514 A1 | 4/2015 | Deshpande |
| 2015/0192774 A1 | 7/2015 | Watanabe |
| 2015/0204684 A1 | 7/2015 | Rostamian |
| 2015/0210199 A1 | 7/2015 | Payne |
| 2015/0298808 A1 | 10/2015 | Huber |
| 2015/0356610 A1 | 12/2015 | Ponoth |
| 2016/0092805 A1 | 3/2016 | Geisler |
| 2016/0129592 A1 | 5/2016 | Saboo |
| 2016/0162162 A1 | 6/2016 | Liu |
| 2016/0224930 A1 | 8/2016 | Kadaba |
| 2016/0224931 A1 | 8/2016 | Shah |
| 2016/0314429 A1 | 10/2016 | Gillen |
| 2016/0371647 A1 | 12/2016 | Loverich |
| 2017/0017301 A1 | 1/2017 | Doornenbal |
| 2017/0041452 A1 | 2/2017 | Amann |
| 2018/0130110 A1 | 5/2018 | McCarthy |
| 2018/0150798 A1 | 5/2018 | Wilkinson |

FOREIGN PATENT DOCUMENTS

| | | |
|---|---|---|
| WO | 2005067438 | 7/2005 |
| WO | 2011054053 | 5/2011 |

OTHER PUBLICATIONS

PCT App. No. PCT/US2018/015428; International Search Report and Written Opinion dated Apr. 6, 2018; 22 pages.

Arox Smart Technologies B.V.; "Smart glasses order picking innovation in warehouse and logistics"; https://www.youtube.com/watch?v=sGBNpvqT-kc; Published on Apr. 21, 2016; pp. 1-7.

Burnha, Ted; "Smart Glasses for Warehouses: SmartPick"; http://postscapes.com/smartglassesforwarehousessmartpick; Jul. 4, 2016; pp. 1-3.

Connect Smart Glasses and SAP with the Simplifier; https://www.youtube.com/watch?v+ZWsBHISOqjA; 5 pages.

DHL; "Vision Picking at DHL—Augmented Reality in Logistics"; https://www.youtube.com/watch?v=I8vYrAUb0BQ; Published on Jan. 26, 2015; 5 pages.

Frederick, E.; "USPS looks into AR glasses to stay relevant and efficient"; published Apr. 10, 2015; http://www.wearables.com/usps-ar-glasses-smartglasses; 4 pages.

Itizzimo; "Connect Smart Glasses and SAP with the Simplifier"; https://www.youtube.com/watch?v=ZWsBHISOqjA; Jun 5, 2013; pp. 1-6.

Knapp AG; Knapp AG—KiSoft Vision; https://www.youtube.com/watch?v=BWY8uFlteIM; Published on Dec. 7, 2011; pp. 1-7.

Kpit; "Augment Reality, Hands Free Warehouse Picking Solution with Wearable Glass"; https://www.google.com/url?q=https://www.kpit.com/downloads/brochures/oracle/smart-glass-warehouse-picking-solution.pdf&sa=U&ved=0ahUKEwi8vsjt-OfbAhWJ44MKHUJID9sQFggEMAA&client=internal-uds-cse&cx=002791226943158673312:jhlwkoeudrk&usg=AOvVaw0CH-U7bNVPZi218YaIX32; 2015; pp. 1-4.

PCT App. No. PCT/US18/15151; International Search Report and Written Opinion dated Apr. 12, 2018.

(56) References Cited

OTHER PUBLICATIONS

PCT; App. No. PCT/US2018/024516; International Search Report and Written Opinion dated Mar. 27, 2018.
Picavi GmbH; "Picavi: Vision Picking with Smart Glasses"; https://www.youtube.com/watch?v=B6zPnVGS0VI; Published on Mar. 5, 2015; pp. 1-12.
Reif, Rupert, Gunthner, Willibald A.; "Pick-by-Vision: An Agumented Reality supported Picking System"; WSCG; ISBN 978-80-86943-93-0; 2009; pp. 57-64.
SAPEnterpriseMobile; "SAP & Vuzix Brings you Augmented Reality Solution s for the enterprise"; https://www.youtube.com/watch?v=9Wv9k_ssLcl; Published on May 12, 2013; pp. 1-16.
Warehouse Logistics; "Arox Logistics IT"; published Jul. 7, 2016; https://www.vuzix.com/Partner/Index/39; 3 pages.
PCT App No. PCT/US2018/024487; International Search Report and Written Opinion dated May 24, 2018.
Böhme, T.; "Augmented Reality and Wearables: What the Experts Say"; http://news.sap.com/augmented-reality-wearables-thats-experts-say/; Jan. 22, 2015; 6 pages.
DHL; Vision Picking at DHL—Augmented Reality in Logistics; https://www.youtube.com/watch? v=18vYrAUbOBQ; Published on Jan. 26, 2015; 8 Pages.
Global IP News. Business and Commerce Patent News, "Zhao Peng, Ihrie Jennifer, Szeto Margaret, Lee Kevin Wook and eBay Inc File United States Patent Application for Augmented Reality for Shipping," New Delhi, Pedia Content Solutions Pvt. Ltd., Apr. 25, 2014.
Glockner, Holger; "Augmented Reality in Logistics: Changing the way we see logistics—a DHL perspective"; Published in 2014; 28 pages.
iTiZZiMO; "Connect Smart Glasses and SAP with the Simplifier"; https://www.youtube.com/watch? v=ZWsBHISOqjA; Published on Jun. 5, 2013; 13 pages.
MHI; "Vision Picking Technology"; http://www.mhi.org/ofs/solutions-guide/vision; Copyright 2017; 3 pages.
Mobipromo Systems; "MobiPromo Advanced WiFi Marketing System"; https:// www.youtube.com/watch?v=XLlojWcd2fQ; Published on Oct. 30, 2013; pp. 1-8.
Picavi Pick by Vision; "The Future is now"; http://web.archive.org/web/20150818051716/http://www.logcom.de/english/; Aug. 18, 2015; 13 pages.
Picavi—Pick by Vision; "100% Ready to Use!"; http://www.logcom.de/english/mypicavi/; Retrieved on Nov. 3, 2015; 5 pages.
USPTO; U.S. Appl. No. 15/882,526; Office Action dated Jan. 17, 2019.
USPTO; U.S. Appl. No. 15/882,526; Office Action dated Sep. 5, 2018; (pp. 1-29).
USPTO; U.S. Appl. No. 15/882,526; Office Action dated Sep. 5, 2019.

* cited by examiner

SYSTEMS, METHODS AND APPARATUS FOR DISTRIBUTION OF PRODUCTS AND SUPPLY CHAIN MANAGEMENT

CROSS-REFERENCE TO RELATED APPLICATION(S)

This application claims the benefit of U.S. Provisional Application No. 62/452,109, filed Jan. 30, 2017, and U.S. Provisional Application No. 62/452,058, filed Jan. 30, 2017, which are incorporated by reference in their entirety herein.

TECHNICAL FIELD

This invention relates generally to supply chain management and, more specifically, to utilizing smart accessories and devices for support therewith.

BACKGROUND

A supply chain for a product can be a useful tool for companies to determine where a product has been, who has handled the product, and where the product is going. It can be difficult to maintain an accurate and complete supply chain, however, if workers have to manually retrieve and enter information to the supply chain. Additionally, utilizing a workstation or handheld tablet can slow the efficiency of a worker by requiring a worker to carry less or put packages down to enter or retrieve information.

BRIEF DESCRIPTION OF THE DRAWINGS

Disclosed herein are embodiments of systems, apparatuses and methods pertaining to distribution and supply chain management. This description includes drawings, wherein.

Figure 1:
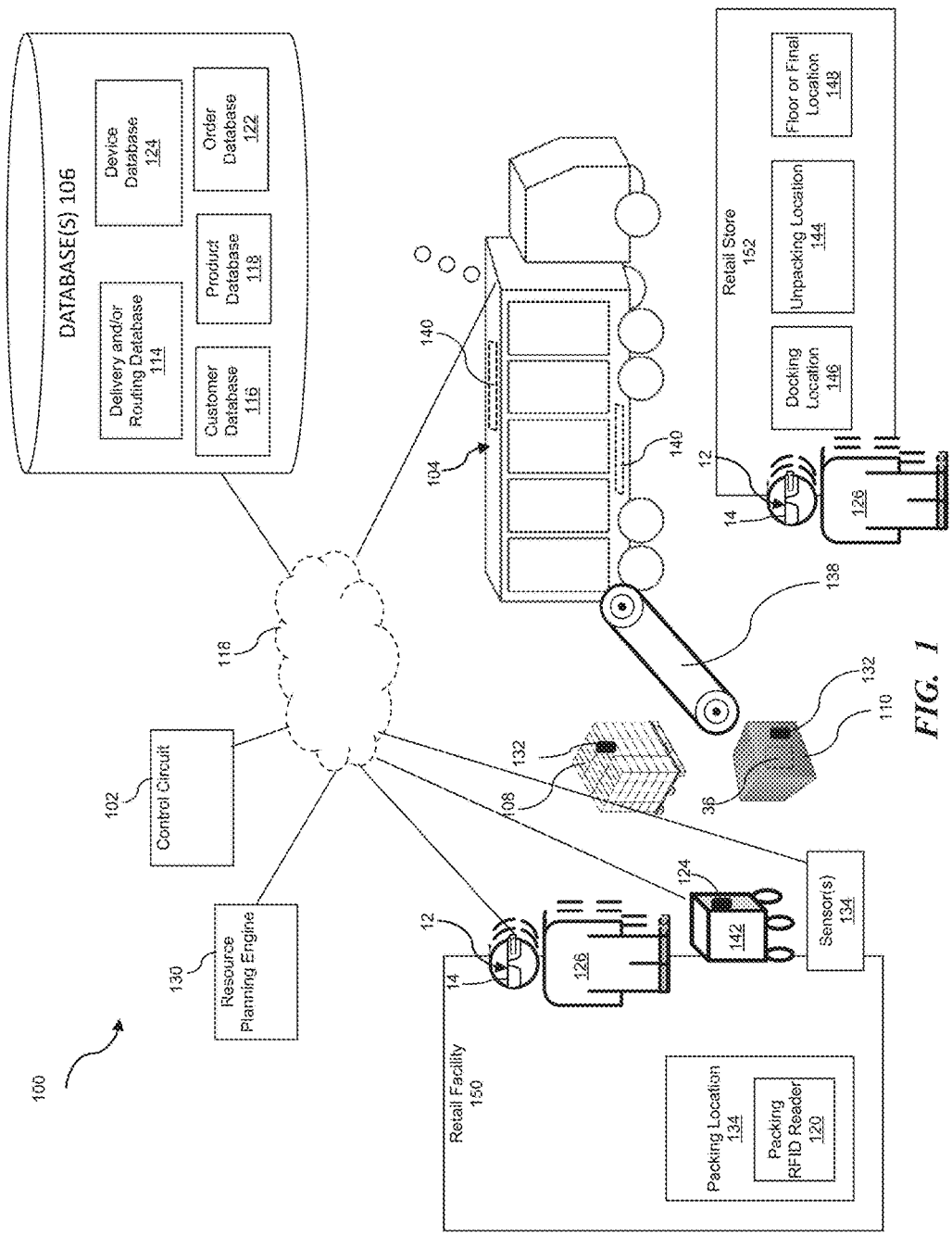
FIG. 1 is a schematic illustration of an exemplary system for distribution, delivery, and management of products in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to access, monitor, and advance a work flow for a product or a plurality of products, especially during product distribution or delivery. In some embodiments, such a system employs RFID tags and wearable smart devices such that products are monitored as they are unloaded from shipments at a retail facility, such as a distribution center, and repackaged into containers and onto a delivery truck or vehicle for delivery to another retail facility, such as a physical retail store, or one or more customers. Furthermore, the RFID tags, wearable smart devices, and a delivery vehicle manifest or planogram can assist with unloading a delivery vehicle in an organized, efficient, and optimized manner.

By one approach, a system for tracking products in real-time includes a database with inventory records of bundles of items (i.e., pallets, containers, boxes, or other groupings) associated with a shipment, bundle RFID tags or identifiers associated therewith, bundle locations, and item destinations and wearable eyeglass frames with an electronic assembly including a display device, a speaker, and an RFID tag reader configured to scan the bundle RFID tags of the items unloaded from the shipment by a user wearing the frames. In such a configuration, a control circuit in communication with the RFID tag readers and the database is configured to receive identifying information for a bundle RFID tag associated with a bundle of items (such as, for example, from the RFID tag readers) and update the database with an item location upon receipt of the bundle of items at a distribution center and/or the identifying information of the bundle RFID tag via the RFID tag readers. Further, in one approach, when a shipping container is packed at the distribution center (with products from one or more of the bundles of items) for delivery to a retail facility or a customer, the control circuit associates the shipping container, via a container and/or a product RFID tag, with the products packed into the shipping container and provide instructions to a user loading a delivery vehicle regarding placement and intended location of the shipping containers within the delivery vehicle as the shipping containers are loaded thereon (such as, for example, via the wearable eyeglass frames). In this manner, the system provides feedback and other information to the user or wearer of the eyeglasses during various work flow and facilitates efficient and safe movement of the products to their final destination in an organized manner.

As used herein, the eyeglass frames generally have a pair of temple arm members configured to rest on ears of the user (i.e., the person wearing the glasses) and a front support having a bridge portion configured to rest on a nose of the user. Further, the eyeglasses typically have audio capabilities, a visual display device, and/or speaker, as outlined below. In one configuration, the associate user includes an individual loading or unloading the delivery vehicle or shipments described herein. Further, such eyeglass frames may be communicatively coupled to the control circuit such that information can be exchanged therebetween. Accordingly, the eyeglass frames and the control circuit, in some configurations, update the database upon the loading (or unloading) of the bundles, pallets, boxes, packages, and/or containers into (or from) the shipments or delivery vehicles.

By one approach, the eyeglass frames recognize the RFID tag associated with the bundle, pallet, box, or container, via the RFID tag reader or scanner incorporated therewith, and relay that information (possibly along with positional information of the item) to the control circuit and/or database(s). In one illustrative configuration, the database(s) are updated to associate the delivery vehicle with the shipping containers loaded therein, the container or product RFID tags associated with the shipping containers loaded therein, and the products packed therein. In operation, this may occur upon receipt of a scan of the RFID tags as the shipping containers are loaded into the delivery vehicle.

As used herein, the bundles of items may have a bundle RFID tag associated therewith, the items within the bundles (e.g., the products) also may have a product RFID tag associated therewith, and the shipping containers that receive portions of the bundles may have a container RFID tag associated therewith. In this manner, an associate user at the retail facility equipped with the eyeglasses (or an autonomous robot with RFID scanning capabilities as discussed below) identifies the bundles of items being unloaded (via the bundle RFID tags), determines where the products should be placed (e.g., an unpacking or packing area as discussed below or a shelving or storage area), and identifies the shipping containers via the container RFID tags where items or product from the bundles should be placed. By employing RFID tags in this manner, the system provides a real-time status update of the unloading, unpacking, and the shipping status of the products. Further, while such a system may be configured with RFID tag readers disposed at the unloading or loading point of the delivery vehicle and an RFID tag reader disposed at the shipping container loading area, the eyeglasses and/or autonomous robot may have an RFID tag reader or scanner incorporated therein that can be used at both locations and at locations therebetween. While previous approaches may have employed visual scanning techniques, the RFID tags and readers incorporated therein do not require line of sight capabilities. Generally, the RFID tag readers or scanners incorporated into the eyeglass frames and/or other devices discussed herein are near-field RFID readers that permit fairly precise location determination of the RFID tags and containers, boxes, or bundles associated therewith. In some configurations, the RFID tag readers are configured to detect the relation of the RFID tags relative to one another in addition to the location thereof.

In some embodiments, the system includes a container packing location where the bundles of items are deposited after removal from the shipment, where the bundles are depalletized or disaggregated (if necessary), and where the products from the bundle of items are placed into the shipping containers with RFID tags incorporated therewith. To assist with reading of the RFID tags at the packing location, in some configurations, the system includes a secondary RFID tag reader, such as a tag reader that is installed at a container packing location. In this manner, the secondary RFID tag reader may scan RFID tags on the products being deposited into the shipping containers and/or the shipping containers. In other configurations, the system may employ associates wearing smart devices, such as smart eyeglasses, to scan products being deposited into the shipping containers and/or the containers themselves. Further, a combination of installed secondary RFID tag readers and wearable smart devices may be employed. Further, the control circuit, in such a configuration, updates the database upon receipt of a reading that one or more of the products are deposited into a particular shipping container for shipment thereof according to the information obtained by the secondary RFID tag reader (or other tag readers) at the container packing location. In one illustrative approach, the packing location includes RFID shielding (which may improve readings and precision of the readings taken at the packing location) such that product and/or container RFID tags are not inadvertently scanned by one or more of the secondary RFID tag readers located at the packing location.

By one approach, the system includes both the container RFID tags associated with the shipping containers and product RFID tags associated with the products disposed within the shipping container to help track the products and movement thereof. Further, in such a configuration, the database includes a product RFID tag identifier and a container RFID tag identifier associated with the shipping container. In operation, the RFID tag associated with one of the shipping containers or the products therein may be attached to the shipping container and/or product packaging.

In some configurations, the system including the control circuit (and optionally a resource planning engine, if present) are configured to develop a planogram of the shipment in the delivery vehicle. As used herein, the delivery vehicle planogram may include a manifest model that indicates the items within the shipment and the location thereof on the delivery vehicle. To assist with monitoring the location of the items within the delivery vehicle, in some embodiments, the delivery vehicle includes RFID tag readers incorporated or disposed therein. By one approach, the RFID tag readers disposed onboard the vehicle are located, for example, in a vehicle ceiling, a vehicle floor, a vehicle door, a vehicle frame, and/a vehicle load and unload point.

In some embodiments, at least some of the bundles, pallets, boxes, packages, or containers are loaded into or out of the delivery vehicles via autonomous robot(s), which are configured to assist with monitoring products as they move within, into, and out of distribution centers and/or delivery vehicles. In one such configuration, a system for tracking products in real-time includes a database with an inventory record having bundles of items associated with a shipment, bundle RFID tag identifiers associated therewith, bundle locations, and item destinations, an autonomous robot having an RFID tag reader configured to scan the bundle RFID tags that are loaded and/or unloaded from the shipment by the autonomous robot, and a control circuit in communication with the RFID tag readers and the database. In such a configuration, the control circuit is configured to receive identifying information for a bundle RFID tag associated with a particular bundle (via the RFID tag reader(s)), update the database with an item location upon receipt of the bundle of items at a distribution center and the identifying information for the one of the bundle RFID tags by the control circuit, associate the container (via a container and/or a product RFID tag) with the products packed into the shipping container (upon packing the shipping container with products from bundle(s) of items for delivery), and provide instructions to the autonomous vehicle or robot regarding placement and intended location of the shipping containers within the delivery vehicle as the shipping containers are being loaded thereon.

In such configurations, the control circuit is further configured to update the database to associate a delivery vehicle with the shipping containers loaded therein, the container or product RFID tags associated with the shipping containers loaded, and the products packed therein, upon receipt of a scan of the RFID tags as the shipping containers are loaded into the delivery vehicle. Further, the autonomous robot, by some approaches, is configured to assist with unloading the shipment and loading of the delivery vehicle, the autonomous robot being communicatively coupled to the control circuit. In one approach, the autonomous robot and the control circuit, which are in communication with one another, update the database upon loading of the containers onto the delivery vehicle.

In one exemplary approach, a method for advancing products through the supply chain may employ RFID tags and readers configured to track products as they are unloaded from a shipment at a distribution center, reconfigured into containers for delivery to retail stores or customers, and loaded onto delivery vehicles. By one approach, the method for tracking and advancing products includes unloading bundles of items (having RFID tags associated therewith) from a shipment via an autonomous robot or wearable eye frames having an RFID tag reader incorporated therein and scanning the bundle RFID tags during the unloading of the bundles of items from the shipment. In such a configuration, the method also includes accessing a database with an inventory record (having the bundles associated with a shipment, bundle RFID tags, bundle location, and item destinations), depositing the items from the bundles in a packing location, packing shipping containers with products from one or more of the bundles of items for shipment to a retail facility, such as a store, and/or a customer based on the item destinations in the database (the shipping containers having a container and/or product RFID tag associated therewith), and loading a delivery vehicle with the packed shipping containers. In addition, in another aspect, the method scans the container and/or product RFID tags upon loading of the packed shipping containers into the delivery vehicle and updates the database to associate the delivery vehicle, the packed shipping containers, the container or product RFID tags, and the products therein.

In such a configuration, the method may further update an item location in the database upon detection of the departure of the delivery vehicle, receipt of a location update regarding the delivery vehicle, and/or arrival of the delivery vehicle at the retail facility or a customer location. The method also includes, in some approaches, sending shipment notification(s) to a recipient physical retail store or the customer based upon the item location in the database. In this manner, the receiving retail stores and/or customers can receive shipment status messages regarding the products ordered and may plan accordingly.

During loading, transit, and/or unloading, the packed shipping containers may be moved within the delivery vehicle. To facilitate capturing a delivery vehicle planogram or model that may be updated in real-time, the delivery vehicle may have one or more RFID tag readers disposed therein to monitor location and/or movement of the shipping containers therein.

Further, to facilitate organization and ease of unloading of the delivery vehicle, the method may include providing an associate unloading the delivery vehicle with instructions, via the wearable smart devices, such as eyeglass frames. By one approach, the glass eye frames include a control circuit, transceiver and a hands-free user input in an electronic assembly. This hand-free user input may provide the instructions to the wearer regarding where to place the bundles of items (or shipping containers) when unloading the shipment.

Accordingly, a wearable smart device and/or an autonomous robot can be used to monitor and update supply chain records, databases, and information for one or more products and direct or advance the products through portions of the supply chain. For example, the information in the supply chain records and databases may be used to direct movement of the various products. In one illustrative embodiment, the wearable smart device advantageously includes a hand-free user input so that the user can send a signal to facilitate advancement of the work flow or products in the supply chain. By one approach, a supply chain for a product can include shipping information, delivery vehicle information, package information, package condition, source information, destination information, storage information, and so forth. In one approach, these pieces of information may help track the product, as well as determine next steps, identifying errors, and responding to changes in retail needs in real-time.

In addition to using smart devices to advance work flows for products at a distribution center, the system, apparatus, and methods described herein also may facilitate work flows and the movement or monitoring of products from the distribution center to the retail store floor or a customer. For example, the system may utilize eyeglass frames with RFID tag readers when unloading delivery vehicles at a retail store or shopping center by instructing the associate user to unload a vehicle according to an unloading plan for the vehicle that is based, in part, on the delivery vehicle planogram. Similar to previously discussed embodiments, employing RFID tags on containers and products permits the system to track products in real-time and adjust or update the unloading plan based on changes in store or customer needs.

As noted above, the delivery vehicle planogram may include a vehicle manifest model that indicates the items within the shipment and the location thereof on the delivery vehicle. A variety of information may be included in the database with the delivery vehicle planogram including, for example, the origination of the items therein and details on how the vehicle is to be loaded. In one illustrative configuration, the delivery vehicle planogram and/or one of the databases associated therewith may include images of the loaded delivery vehicle, such as, for example, in varying stages of loading and/or unloading such that the images may be viewed sequentially to obtain a full, detailed picture of the packed delivery vehicle. As suggested below, the system (including the control circuit and resource planning engine, if present) may consider this information when developing the plan for unloading the vehicle.

In operation, the system may use the available information including the delivery vehicle planogram to systematically process and unload shipments, such as, for example, by assigning priorities and assessing the feasibility of certain plans or models and the work required to unload the delivery vehicle in a particular manner. In this manner, the associates at a retail store are not randomly grabbing the closest boxes to remove those from the shipment, but instead, are unloading the shipment in an ordered manner. In operation, the delivery vehicle is unloaded in an orderly and efficient manner via an unloading plan, which may be adjusted based on the needs of the store such that, for example, a store may determine one or more paths to the items needed quickly and safely so that unstable loads are avoided when associates are hurrying to unload certain products. Also, by tracking the shipping container or products with RFID tags, the system has a real-time awareness of a product's location and can correct or update the unloading plan based on needs and/or mistakenly placed items, such as, for example, if shipping containers are incorrectly grabbed or moved. More particularly, by having RFID tag readers scan the shipping containers being unloaded, the delivery vehicle planogram and the unloading plan may be updated in real-time. Such a configuration that physically tracks the products provides a feedback loop that may help facilitate moving products quickly through the supply chain and may provide an optimized allocation of resources or goods.

In addition to the delivery vehicle planogram or model, the system may consider other relevant information when developing the unloading plan such as, for example, a store's needs, the product or the quantity of the product on the delivery vehicle and/or the retail store floor, facilitating an organized, efficient, and safe process to avoid unstable shipments or loads and prevent a messy or disorganized dock, the availability of store resources, efficient and effective use of store resources (e.g., assigning someone to unload large pallets who has equipment suitable for efficiently and safely handling such pallets), available space (i.e., based on where the shipping containers are to be unloaded, and/or the organization of the retail store floor, stock room, and dock, and the truck (as modeled via the delivery vehicle planogram). In this way, the user's current location and the proximity to a final or intermediate destination of items may be taken into account.

In some embodiments, the system includes a database with a vehicle planogram having shipping container and/or product RFID identifiers associated with a particular vehicle location, eyeglass frames with an RFID tag reader, and a control circuit configured to send instructions to the user wearing the eyeglass frames to unload a particular one of the shipping containers on the delivery vehicle (via an unloading plan), receive scanned information from the RFID tag reader confirming identification of the particular shipping container, send instructions to the user (via the eyeglass frames) regarding placement of the particular shipping container outside of the delivery vehicle, and update the database regarding an unload location of the particular shipping container upon removal of the particular shipping container from the delivery vehicle. As used herein, the unload location of the particular shipping container may include, for example, a final destination (such as a floor location in the store), an intermediate destination (such as a container unpacking area), or a dock destination. Further, by some approaches, the database may include a product destination and the control circuit may send instructions to the user regarding placement or movement of the shipping container and/or products according to the unloading plan and the product destination (if present in the database).

While the wearable eyeglass frames may receive the unloading plan (or portions thereof) from the control circuit in some configurations, in other configurations, the wearable eyeglass frames may develop or create the unloading plan or update it, such as, for example, during the unloading process. This may be particularly helpful for certain configurations (such as those where changes to the shipment have occurred during transit) because the RFID tag reader of the eyeglass frames is able to scan the shipment in front of the wearer to identify the location of various shipping containers and associated RFID tags.

In one illustrative approach, the unloading plan is generated and optimized by analyzing the delivery vehicle planogram and a number of factors, such as, for example, assigned priorities of the shipping containers, work required to unload the shipping containers based on the weight and size of the particular shipping container, and safety and stability of the delivery vehicle planogram and resulting changes thereto with removal of one or more of the shipping containers. In this manner, if a retail store is completely out of a certain product that is in high demand, the database may assign a high priority to the shipping container with those products or items therein. Thus, the more in-demand products will leave the delivery vehicle more quickly and can be routed directly to a floor area by instructing the associate user, via the eyeglass frames, to place the products where they are needed on the store floor. In this manner, the products may be moved from the delivery vehicle directly to the shelf of the store floor and may bypass the docking or unpacking area. By one approach, the assigned priorities of the shipping containers are assessed, for example, according to identified needs of a retail facility or customer, organization of the delivery vehicle, and a floor plan of the retail facility.

In one illustrative approach, the control circuit and/or the smart devices at a recipient retail store receive the delivery vehicle planogram (which is based, at least in part, on scans of shipping container and/or product RFID tags at the distribution center where the shipping containers are loaded onto the delivery vehicle and associated locations within the delivery vehicle). In another aspect, the control circuit and/or the smart devices at the recipient retail store may update the delivery vehicle planogram (and possibly the unloading plan) during the unloading process of the delivery vehicle. For example, as shipping containers are removed from the vehicle or moved within the vehicle, the delivery planogram is generally updated accordingly in real-time.

Further, the unloading plan may be updated based on the movement of the shipping containers and changes to the factors mentioned above, such as assigned priorities or their relative weight or the safety and stability of the shipping containers in the delivery vehicle, which may be impacted by the movement of the shipping containers within the vehicle. Indeed, the control circuit in some configurations adjusts the unloading plan to avoid unstable shipping containers or inventory and to match unloading resources to the effort required to unload particular items. In addition, the control circuit, by one approach, updates the unloading plan in response to at least one of a change to retail facility needs, a change of customer needs, a change in available staffing, and/or the updated delivery vehicle planogram.

As used herein, the unloading plan may include instructions to deliver one of the packed shipping containers to a facility final destination (such as a retail floor location), instructions to deliver one of the shipping containers to an intermediary destination (such as an unpacking location), instructions to deliver one of the packaging containers to a dock destination, or instructions to break down or remove packaging materials from the delivery vehicle or a dock area.

In one exemplary configuration, a method for facilitating work flow and tracking products at a retail facility (after receiving a shipment on a delivery vehicle) includes instructing a user with eyeglass frames to unload a particular shipping container (which can include, for example, a box, pallet, bin, or other container) according to an unloading plan, scanning container and/or product RFID tags while unloading the shipping containers, instructing the user (via the eyeglass frames) regarding placement of the particular shipping container outside of the delivery vehicle, and updating the database regarding an unload location of the particular shipping container upon removal from the delivery vehicle. By one approach, around the time when the shipment arrives at the retail store, the control circuit may finalize the unloading plan and provide it, along with the delivery vehicle planogram to the associates at the store. As suggested above, the delivery vehicle planogram received at the receiving retail store typically include shipping container and/or RFID tags or identifiers associated with a particular vehicle location. In this manner, the delivery vehicle may be efficiently unloaded by using the RFID tags on the shipping containers, the wearable devices of the associates, and tracking both the needs of the retail store and/or customers and the progression of the unloading process. In another aspect, the wearable devices at the receiving store may create or update the unloading plan upon receipt of the delivery vehicle planogram and/or the unloading plan.

To enable the control circuit to generate an unloading plan, the method also typically includes generating a delivery vehicle planogram at the shipping location, such as, for example, by scanning RFID tags associated with shipping containers and/or products as they are loaded onto the delivery vehicle and associating a vehicle location of the shipping containers in the delivery vehicle to generate the delivery vehicle planogram. To ensure accuracy of the delivery vehicle planogram prior to arrival of the shipment at the retail store, the method also may monitor movement of the shipping containers within the delivery vehicle via one or more onboard RFID tag readers disposed in the delivery vehicle.

As suggested above, the delivery vehicle planogram and the unloading plan may be updated during delivery of the shipment or even unloading of the delivery vehicle. This can occur, for example, in response to changing needs of a retail facility or customers and/or a change in available staffing. In one exemplary approach, the method adjusts or updates the unloading plan to avoid unstable shipping containers in the delivery vehicle. By one approach, the control circuit may analyze an updated delivery vehicle planogram to determine the shipments stability and may instruct an associate user (via eyeglass frames) to move particular shipping container(s) in response thereto. By another approach, the control circuit may instruct the user to unload the delivery vehicle in a particular order to avoid having shipping containers disposed in an unstable arrangement.

In addition to instructing the user to move the shipping containers and/or products, the eyeglass frames may instruct the user to break down or remove packaging materials from the delivery vehicle or dock area. Similar to avoiding unstable shipments, the removal of such materials helps retain a safe and clean work environment.

Accordingly, wearable smart devices, such as eyeglass frames, can be employed with certain databases to optimize the unloading of a delivery vehicle, thereby making the process quicker and safer. The wearable devices may receive an unload plan and/or instructions for unloading, but also may provide an updated unloading plan using the information, such as the RFID tag information, available thereto to respond to developments regarding the delivery vehicle in real-time. For example, the wearable smart device can develop an updated unloading plan based on the products and quantities within the delivery vehicle and the location thereof, the state of the delivery vehicle, and destinations of the various shipping containers or bundles of items and products therein.

FIG. 1 illustrates a supply chain management system 100 that permits tracking of products in real-time via RFID tags and wearable smart devices 12, such as eyeglasses or eyeglass frames 14, with RFID tag readers 56 (FIG. 2) incorporated therein that monitor products as they are unloaded from or loaded onto shipments at a retail facility 150, such as a distribution center. Further, the system 100 may facilitate repacking of items into containers that may be loaded onto a delivery truck 104 for further distribution to other retail facilities or a recipient physical retail facility, such as retail store 152, or directly to customers. To facilitate the management and tracking of products, the system 100 typically includes one or more databases 106, wearable devices with RFID readers, such as eyeglass frames 14, and a control circuit 102, as outlined below. In other configurations, the system 100 may include one or more autonomous robots 142 having an RFID tag reader 124 in addition to or in lieu of the wearable devices, such as eyeglass frames 14.

By one approach, the database(s) 106 include a plurality of databases, such as, for example, a delivery and/or routing database 114 that may include information about shipments and delivery vehicles, a customer database 116, a product database 118, an order database 122, and a device database 125. The database 106, in an exemplary approach, has an inventory record with pallets or bundles 108 of items that are associated with a shipment (i.e., the bundles 108 that make up a shipment are associated with the shipment in the database 106). Further, the inventory record in the database 106 also generally includes a bundle location and a destination (or an anticipated destination) associated therewith.

In some embodiments, the pallets or bundles 108 of items have RFID tags 132 associated therewith, as discussed below. To that end, the pallets or bundles 108 are associated in the inventory record (in database 106) with the shipment and the RFID tag information.

In one configuration, when a shipment is being unloaded from a delivery vehicle 104 at a retail facility 150 such as a distribution center, the control circuit 102, by accessing the database(s) 106 and communicating with the wearable smart device(s) 12, receives identifying information for a bundle 108 of items by receiving information on an RFID tag 132 associated with the bundle 108 (via the RFID tag readers 56 associated with the wearable smart device 12) and updates the database 106 with an item location of the items or products in the bundle 108 upon receipt of the bundle and the identifying information thereof by the control circuit 102.

Further, when the pallets or bundles 108 of items are un-palletized or broken down and repackaged into shipping containers 110, the control circuit 102, by one approach, associates the shipping container 110 with a container or product RFID tag 132 and the products packed into the shipping container 110, upon packing a shipping container 110 with the products. After packing of the shipping container 110, the control circuit 102, by one configuration, provides instructions (such as via the wearable device 12, regarding placement and intended location of the shipping containers 110 within a delivery vehicle 104 as the shipping containers 110 are loaded thereon. In addition, the control circuit 102, in one approach, updates the database (s) 106 to associate the delivery vehicle 104 with the shipping containers 110 loaded thereon. It also may correlate the container or product RFID tags 132 associated with the shipping containers 110 loaded in a shipment and the products packed therein. By one approach, upon receipt of a scan of the RFID tags from the shipping container 110 or products 36 packaged therein, which may occur as the shipping containers 110 are loaded onto the delivery vehicle 104, the database 106 is then updated. By one approach, the RFID tags 132 are attached to the shipping containers 110. By another approach, the RFID tags are attached to the product packaging or the product 36. In another configuration, RFID tags 132 may be attached to either one or both of the shipping container 110 and the product 36.

Figure 2:
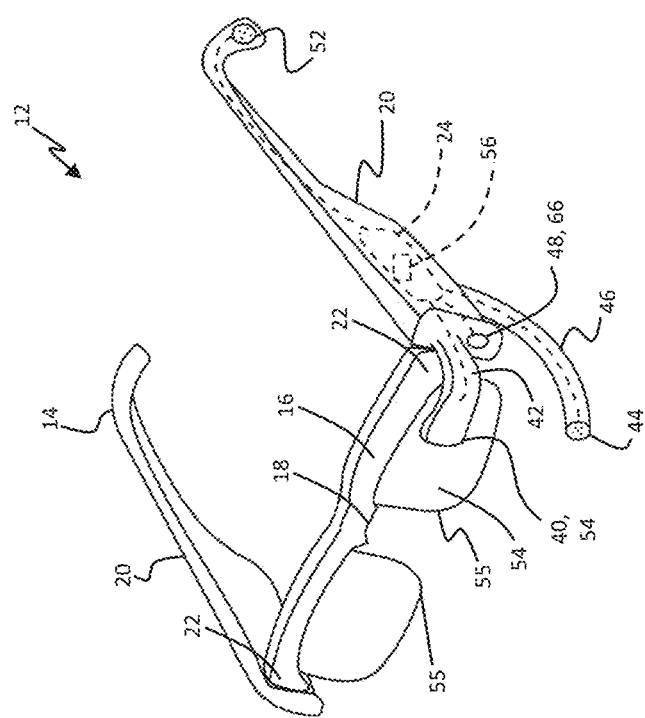
FIG. 2 is a perspective view of smart glasses having an electronic assembly mounted thereto in accordance with some embodiments.

The wearable smart devices 12, such as the eyeglass frames 14 illustrated in FIGS. 1 and 2, are configured to be worn by an associate user 126. By one approach, the wearable smart devices 12, in the form of eyeglasses 14, include a front frame portion 16 including a bridge 18 configured to rest on the nose of a user and temple arms, such as temple members 20 extending rearwardly from lateral end portions 22 of the front frame portion 16, such that the temple members 20 are configured to rest on ears of the user. If desired, the temple members 20 can be pivotably mounted to the front frame portion 16, such as by a hinge or the like, so that the glasses 14 can be collapsible to a storage configuration.

Figure 3:
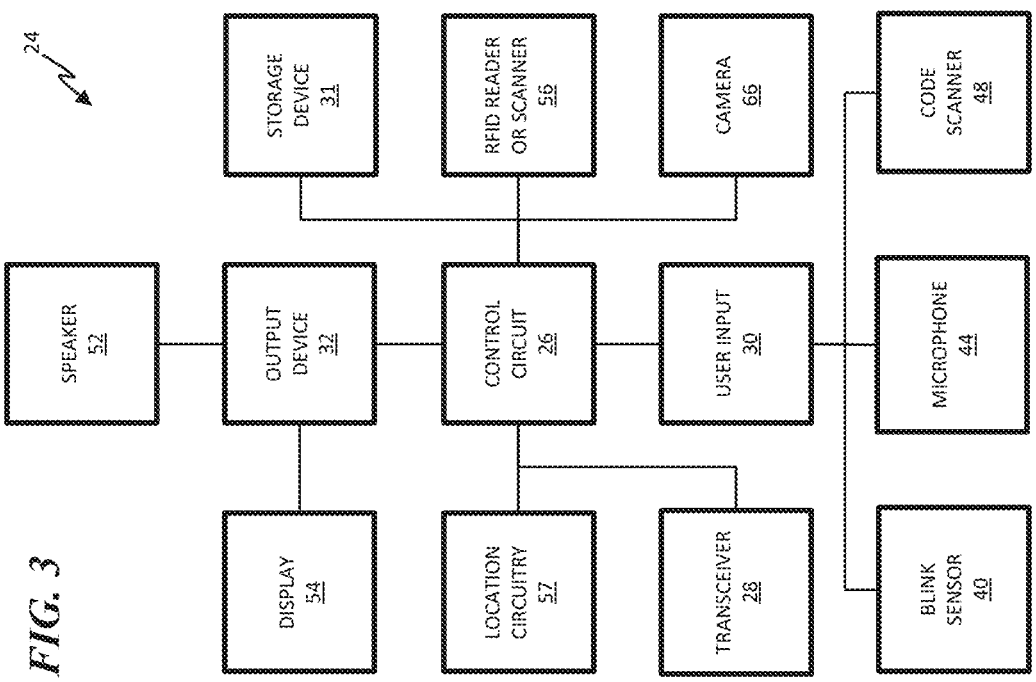
FIG. 3 is a diagrammatic view of an electronic assembly in accordance with some embodiments.
Figure 4:
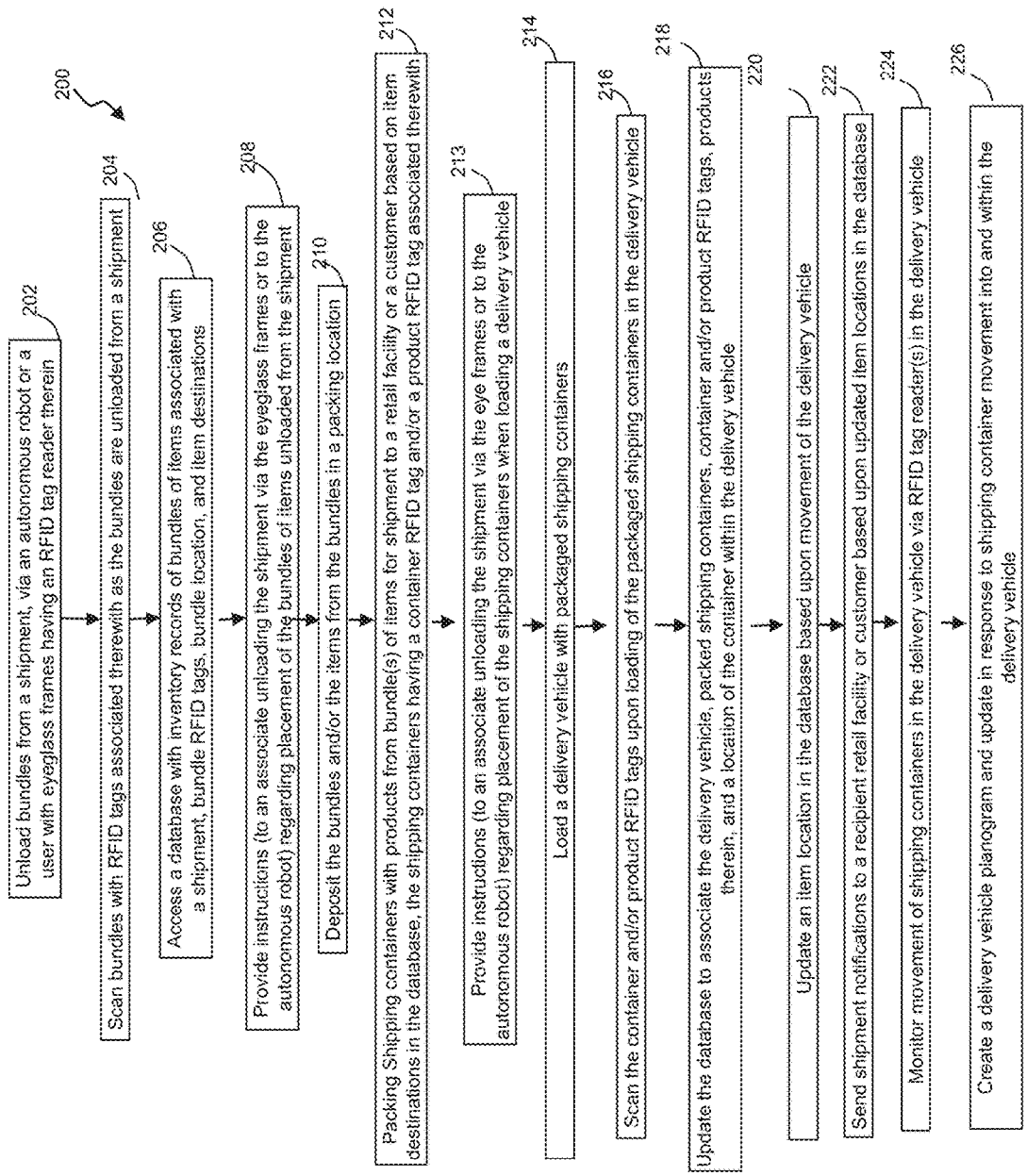
FIG. 4 is an exemplary flow diagram in accordance with several embodiments.
Figure 5:
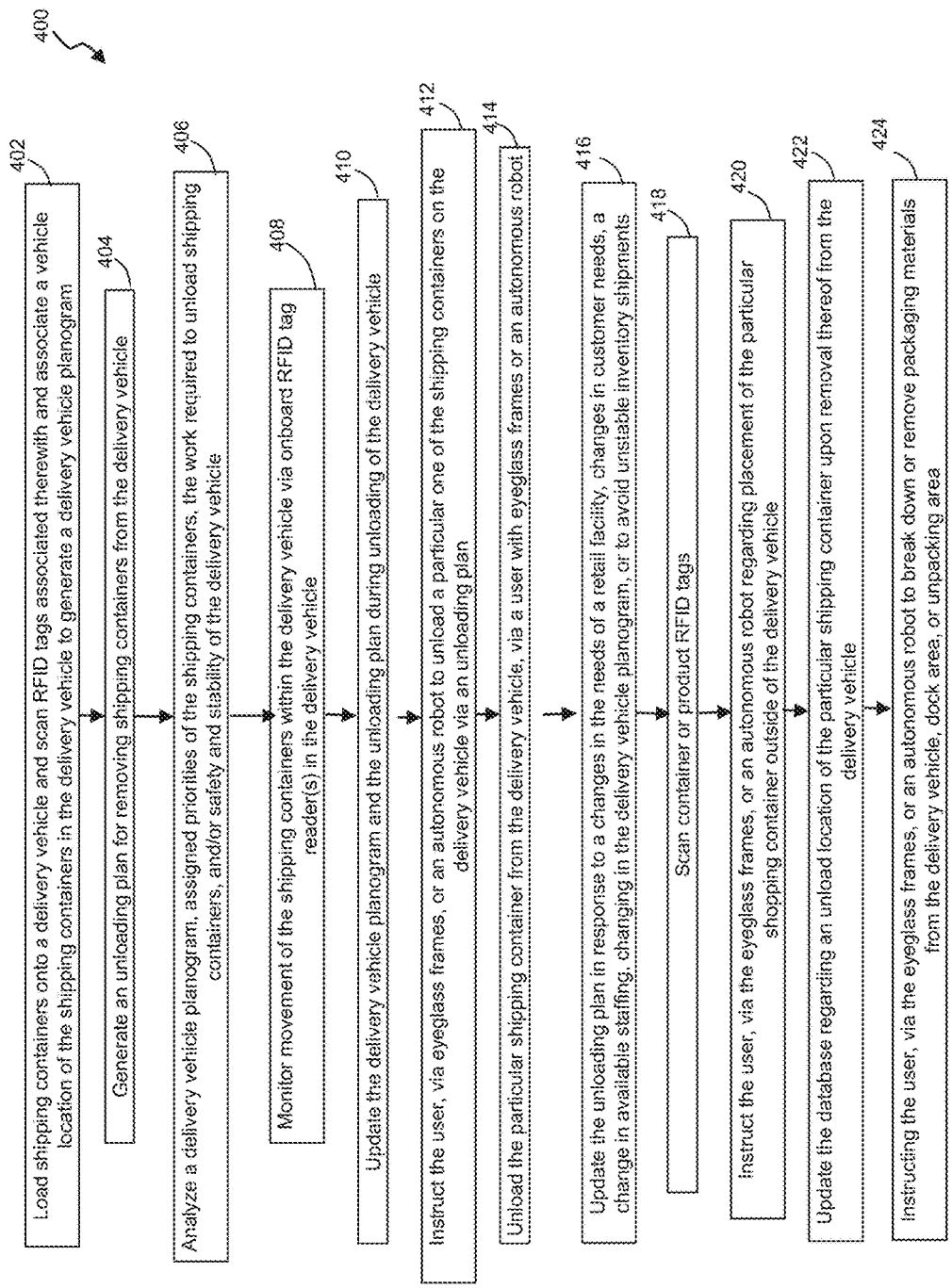
FIG. 5 is an exemplary flow diagram in accordance with several embodiments.

The glasses 14 further include an electronic assembly 24 mounted thereto. As shown in FIG. 3, the electronic assembly 24 can include a control circuit 26, a transceiver 28, a hands-free user input 30 configured to allow a user to send various signals, a local storage device 31, an RFID tag reader 56, and an output device 32 configured to present information to the user. So configured, the glasses 14 can be utilized by a user to aid in work flow management and tracking of products in real-time, as described herein.

The glasses 14 can be operated by the user to communicate with a central control circuit 102 to receive or retrieve a work flow, information, or instructions regarding placement or treatment of a pallet or bundle of items 108 or a shipping container 110 from a database 106. As illustrated in FIG. 1, the various devices of system 100 may communicate directly or indirectly, such as over one or more distributed communication networks, such as network 119, which may include, for example, LAN, WAN, Internet, cellular, Wi-Fi, and other such communication networks or combinations of two or more of such networks.

The term control circuit refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 102, 26 may be configured (for example, by using corresponding programming stored in a memory as will be well understood by those skilled in the art) to carry out one or more of the steps, actions, and/or functions described herein.

As discussed above, the glasses 14 can include the hands-free user input 30. The user input 30 can take a variety of suitable forms. The user input 30 is configured so that a user can send signals or data to the remainder of the system 100 without having to put down objects or stop working to manipulate a button or other switch.

In one approach, the user input 30 can be a blink sensor 40. The blink sensor 40 is configured to identify a blink of the user to be actuated thereby. If desired, the blink sensor 40 can be configured to compare the blink of the user to a stored blink, such as storage in the local storage device 31 or the device database 125, in order to authenticate the user for commands requiring authorization. The blink sensor 40 can be mounted to an extension portion 42 of the glasses 14 that extends to be disposed forward of an eye of the user. The extension portion 42 can extend from the front frame portion 16 or one of the temple members 20, as desired.

In another example, the user input 30 can be a microphone 44 configured to receive voice commands from the user. The microphone 44 can be mounted directly to the front frame portion 16 or one of the temple members 20, or can be mounted to an extension portion 46 extending from the front frame portion 16 or temple member 20 to a position closer to the user's mouth. The control circuit 26 can be configured to recognize a variety of verbal commands, as set forth in more detail below.

In another approach, the user input 30 can be a scanner 48 configured to read machine-readable codes 50. The scanner 48 can be mounted to the glasses 14 and oriented to scan codes 50 disposed generally forwardly of the user. So configured, a user can just look at a code 50 for a predetermined amount of time, such as 2 to 5 seconds, or the like, the scanner 48 will read the code, and the control circuit 26 will perform an action indicated by the code 50. For example, the action can be to signal the completion of the task, such as a pick, place, packaging, or other task. In other examples, the code 50 can cause a help signal to be sent to a supervisor or the like or can cause an alarm to sound. Advantageously, a plurality of codes 50 can be mounted to the wall in the work place, to shelving, or other conveniently location area that can be easily viewed by the user.

By one approach, the user input 30 can be actuated by the user to indicate that a task in the work flow for a particular product is completed or that additional information on the instructed location of a bundle 108 or shipping container 110 is needed to ensure proper placement thereof. If desired, the user can also indicate with the user input 30 when a task has been started. Accordingly, the user can utilize the glasses 14 to work more efficiently, without having to stop and update the work flow process using a hand manipulated switch or button.

As set forth above, the electronic assembly 24 includes the output device 32. The output device 32 is configured to relay information to the user, such as instructions regarding placement location of bundles 108 or containers 110, breaking down of bundles 108, repackaging, other task or work flow information, confirmation, etc. The output device 32 can take a variety of forms. In a first form, the output device 32 can be a speaker 52 disposed adjacent to the ear of the user. In a second form, the output device 32 can be a display 54 extending at least partially in front of an eye of the user. The display 54 can be mounted to the front frame portion 16 or can be mounted to extend from the temple member 20. More specifically, the display 54 can be incorporated with or projected onto traditional lenses 55 mounted to the front frame portion 16, which can be refractive and/or tinted as desired. Alternatively, the display can be a separate member extending in front of the lenses 55 or instead thereof.

So configured, the user can be presented with the work flow and task information (e.g., instructions regarding picking or placing bundles 108, products 36, or shipping containers 110) via the output device 32, complete the task and send a completion signal via the user input 30 and/or the RFID tag reader 56, and receive a confirmation signal via the output device 32. Upon receiving the signal indicating that the task is complete, the system 100 can update the work flow for the product 36 and/or the database 106. If desired, the system 100 can then cause a next task to be sent and presented to the user via the output device 32. The user can also indicate using the user input 30 acceptance of the task. In some circumstances, such as, for example, after placement of a bundle 108 or container 110 with an RFID tag 132 incorporated therein, the RFID tag readers in the system 100, such as the RFID tag readers 56 incorporated into the glasses 14, may already sense when a task is completed and may recognize and close the task or confirm that the user wants to close a task.

By a further approach, the system 100 can include location tracking for the associate user 126 via the wearable devices 12. In one form, the electronic assembly 24 can include location determination circuitry 57, such as global positioning or the like. In another form, the system 100 can track a user's location by micro-locationing, telemetry, or the like. As such, the system 100 can monitor the position of the user while the work flow is completed. If desired, upon reception of a new task, or while a task is being performed, the system 100 can provide directions to the user, through the output device 32, to a next location. The next location can be a drop-off or pick-up location for the product 36.

By another approach, the system 10 can be configured to send a user work flow for processing a plurality of products, such as a pallet or bundle 108. For example, a user can receive and complete a task for a first product, such as moving the product to a new location; then receive and complete a task for a second product, and so forth. As such, a user can sequentially unload a shipment, restock inventory, etc. without having to stop to determine subsequent tasks or confirming task completion.

In another form, the system 100 can feed shipping and product data to the eyeglass frames 14 when a shipment is received and the data can be displayed on or emitted from the output device 32. As such, the user can double check the accuracy of the shipment against the data to confirm an accurate count and identity of products in the shipment.

As shown in FIGS. 1-3, the electronic assembly 24 can further include an RFID scanner 56 and the products (e.g., in their bundled form, individual form, or in aggregated shipping containers can have associated RFID tags 132 that contain identification information for the products, which can include item, shipping, specification data, for example. So configured, the RFID tag reader or scanner 56 can read the tags 132 of products, bundles, or containers to identify the products for the user and the system 100. Further the information read from the product RFID tags 132 can be utilized to confirm shipping and work flow information, i.e., confirm that the right products were delivered in the shipment or are in the right location. If desired, the control circuit 26 of the glasses 14 can be configured to scan for a particular product with the RFID scanner 56 or can scan an entire pallet or shipment.

RFID verification can advantageously be utilized in conjunction with sending the task completion signals as a secondary confirmation, in addition to a primary confirmation as noted above. In one example, the control circuit 26 can present a task of processing a new shipment of products (e.g., bundles 108 of items) disposed on a pallet or the like. The control circuit 26 can cause the product data to be presented to the user via the output device 32 and the user can verify the products on the pallet or bundle 108 of items using the data. The RFID scanner 56 can automatically read the RFID tags 132 of the products to verify the data stored on the tags 132.

If desired, one or both of the control circuits 102, 26 can maintain a count of the products handled by the user or within range of the RFID scanner 56, and can be configured to send a low stock signal in response to determining that the count is at or below a predetermined level, such as, for example, if a user at a packing location 134 needs additional products to fulfill upcoming orders or fill shipping containers 110.

In a further form, storage locations for the products in the retail facility 150 such as a distribution center or retail store 152, which can be shelves or portions of shelves, pallets, lockers, and so forth, can include associated RFID tags that can identify the storage locations to the system 100 and the user via the RFID scanner 56. The storage locations at the retail store 152 may include locations on the retail store floor or in a stock room. Accordingly, the RFID tags can be used to identify a given storage location in a task for the work flow. The user can use the RFID tags data to determine whether a particular storage location is the correct storage location identified in the work flow, such as for pick-up or placement.

By one approach as shown in FIGS. 2 and 3, the electronic assembly 24 can further include a camera 66 mounted to the glasses 14 and oriented to capture images and/or video forwardly thereof. In some embodiments, the camera 66 may be configured to capture images of the delivery vehicle(s) 104 in various states of loading or unloading, as discussed herein. The camera 66 can be manually operated, such as via the user input 30, or could have a dedicated control, if desired. The camera 66 can also be automatically operated by the control circuit 26. In either approach, one or both of the control circuits 102, 26 can be configured to analyze the images/video to count the products handled by the user. The count can then be used to determine an inventory level or count for the products. If desired, the control circuits 26, 102 can be configured to send a low stock signal in response to determining that the inventory level or count is at or below a predetermined level.

As set forth above, the system 100 described herein can be utilized to provide the work flow to users through the eyeglass frames 14. Advantageously, the system 10 can also track and record actions/tasks performed by the user with associated documentation in the form of RFID readings and captured images/video. As such, if an error is discovered regarding a particular work flow, such as a product missing or placed in the wrong area, the system 100 can be utilized to determine the steps taken by the product to find the error in the work flow.

As set forth above, the glasses 14, and specifically the electronic assembly 24 and control circuit 26 thereof, can also be utilized to access via the transceiver 28, maintain, and update a supply chain for the product(s). The supply chain record can include any or all of SKU information for the product, a description of the product, a destination of the product, associated bundles or containers thereof, RFID tags associated therewith, dimensions of the products, vendors of the product, a condition of the product, a source of the product, a delivery vehicle used for product, a manifest for the product, and/or a purchase order for the product. Further, the control circuit 26 can be configured to update any of the information for the product in one of the database(s), such as product database 118. Additionally, the supply chain can be stored on the local storage 31 and/or the device database 125. In one form, the supply chain record can be stored on the device database 125, so that multiple users can retrieve or receive the supply chain record therefrom, update the supply chain record, and send the updated supply chain record to the central control circuit 102 to be stored on the device database 125. In one illustrative embodiment, the eyeglasses 14 (being in communication with the control circuit 102) update at least one of the databases 106 upon loading of the shipping containers 110 onto a delivery vehicle.

As discussed above, the electronic assembly 24 can include a microphone 44, such that the user can record an audio message regarding the product 36 and update the supply chain record with the audio message. More specifically, the user can record one or more details regarding the product, such as identification information, a condition of the product, a time of delivery, a time of drop-off, or other shipping information. By a further approach, the control circuit 26 can be configured to operate in response to voice commands, as described above. As such, the user can update information in the supply chain record using a voice command.

Further, in the embodiments where the electronic assembly 24 includes the camera 66, the user can record an image or video regarding the product and update the supply chain record with the image or video. For example, the user can capture an image of the delivery vehicle, the product to show the condition thereof, and so forth.

In some embodiments, as set forth above, the glasses 14 can include the display 54, such as on the lens 55 or separate therefrom. So configured, the user can utilize the display 54 to show the supply chain records, current information, updates, and the like.

In another embodiment, the system 100 may include an autonomous robot 142 configured to assist with the unloading and loading of shipments at the retail facility 150. By one approach, the autonomous robot 142 includes some elements similar to those incorporated into the wearable device 12 including, for example, an electronic assembly, a control circuit, a camera, and an RFID tag reader 124 in addition to a cargo movement device and a motor or other propulsion device such that the autonomous robot 142, in some configurations may perform functions similar to that provided by the associate user with the wearable device 12. The autonomous robot 142 may be used in conjunction with or in lieu of the associate users 126 having the wearable devices 12. The RFID tag reader 124 of the autonomous robot 142 is configured to scan the bundle RFID tags (or the shipping container 110 RFID tags or the product RFID tags) that are loaded (or unloaded) from the shipments.

In configurations with the autonomous robot 142, the control circuit 102 of the system 100 may communicate with the RFID tag reader 124 via the network 119 such that when the control circuit 102 receives identifying information for a bundle RFID tag from the autonomous robot 142, the database(s) 106 can be updated with an item location. Further, when the shipping containers 110 are packed with product(s) 36 for delivery to a retail facility or a customer, the control circuit 102 can associate the shipping container 110, via a container and/or product RFID tag 132, which may be scanned by the autonomous robot 142. Further, the control circuit 102 may provide instructions to the autonomous robotic vehicle 142 regarding placement and intended location of the shipping containers 110 within the delivery vehicle 104 as the shipping containers 110 are loaded thereon.

To facilitate unloading of the delivery vehicle 104, the system 100 also may include a conveyor 138 at the retail facility 150 (or the retail store 152 discussed below). Further, to help monitor the movement of the products and the shipping containers, the conveyor 138 may have an RFID tag reader incorporated therewith.

To facilitate distribution and shipping of products or supply chain management, a retail facility 150 typically includes a packaging area or packing location 134. By one approach, the packing location 134 of the retail facility 150 provides an area for de-palletizing, unwrapping, or otherwise unpacking bundles 108 of items and an area for repacking products or packing shipping containers 110 with items from the bundles 108 (and possibly other materials or items for shipment to customers and/or other retail facilities). Accordingly, the pallets or bundles 108 of items unloaded are placed in the packing location 134 after removal from the shipment.

Further, in some configurations, the packing location 134 is configured to facilitate packing products from the various bundles 108 of items into the shipping containers 110 with the container and/or product RFID tags 132 incorporated therewith. In some embodiments, the packing (and unpacking) location 134 may facilitate, for example, combining products from different shipments (i.e., other delivery vehicles) or breaking down a pallet or bundle 108 of items to send portions thereof to another retail facility, such as a physical retail store 152. In some configurations, this may include having convenient access to a plurality of different products that may be retained in storage locations, as mentioned above. In one exemplary configuration, the system 100 incorporates both a container RFID tag 132 on the container packaging and a product RFID tag on the products 36 placed in the shipping container. In operation the RFID tags associated with the shipping container 110 or products 36 may be attached to the shipping container itself or the product packaging.

By one approach, the packing location 134 may include a secondary or a packing RFID tag reader 120 configured to scan one or more of the RFID tags 132 on the products being deposited into the shipping containers 110 or the shipping containers 110 themselves. In this manner, the control circuit 102 is configured to update the database 106 upon receipt of a reading that one or more of the products 36 are deposited into a particular shipping container 110 for shipment thereof. By one approach, the packing RFID tag reader may be installed at the packing location 134 or may be incorporated into a wearable 12, similar to eyeglass frames 14. In one illustrative approach, the system 100 also includes shielding at the container packing location 134 to improve accuracy of the RFID readings. To further improve accuracy, near-field RFID technology is generally used with the systems provided herein.

Once the shipping containers 110 are packed, they may be loaded onto another delivery vehicle 104 for shipment from the retail facility 150, such as a distribution center, to another retail facility, such as retail store 152 (shown in FIG. 1), or directly to customers. As the shipping containers 110 are loaded onto the delivery vehicle 104, the system 100 may track placement of the shipping containers 110 loaded thereon so as to develop a model or delivery vehicle planogram based on the loading process and the RFID tags 132 and locations of the products associated with the RFID tags.

To further facilitate tracking or management of the products and containers in the supply chain or work flow, the system 100 (such as through the control circuit 102, RFID tag readers 56, 124, and/or databases 106) may develop a truck or vehicle planogram noting where the products 36 and shipping containers 110 are located within the delivery vehicle 104. To that end, the delivery vehicle 104 may include one or more RFID tag readers 140 incorporated therein. For example, the RFID tag readers 140 may be disposed in, for example, a vehicle ceiling, a vehicle floor, a vehicle door, a vehicle frame, or a vehicle load and unload point, such as, for example, a ramp. To facilitate unloading of the delivery vehicle 104, a conveyor 138 may be employed at the retail facility 150 or the retail store 152. To help monitor the movement of the products and the shipping containers, the conveyor 138 may have an RFID tag reader incorporated therewith.

While the control circuit 102 may generate a delivery vehicle planogram, it is generally based on information received from the wearable devices 12 or the autonomous robots 142 at the distribution center 150 or the delivery vehicle 104. Accordingly, the control circuit is configured to receive information regarding the shipping container and/or product RFID tags 132 loaded into a delivery vehicle 104 and the associated location of these containers disposed within the delivery vehicle 104. Further, while the control circuit 102 may access one of the databases 106 with information regarding products associated with the RFID tags, the product information also may be provided to the control circuit 102 along with tag identification information scanned via the RFID tag readers incorporated into the eyeglass frames or the autonomous robot discussed above.

The delivery vehicle planogram, which is based on information received from a distribution center including scans of RFID tags associated with the shipping containers loaded onto the delivery vehicle and associated locations within the delivery vehicle, is used to plan and execute the unloading of the delivery vehicle via an unloading plan. By one approach, the unloading plan is generated by the resource planning engine 130, which may analyze the needs of a store and/or customer(s), available resources, system priorities and determine how to efficiently unload the vehicle. Further, the system 100 may instruct associate users 126 wearing the wearable smart devices 12 to implement the unloading plan.

The delivery vehicle planogram may be stored in one of the databases 106, such as the delivery and/or routing database 114. The delivery vehicle planogram generally may include the information typically available on a vehicle or transportation manifest, but also typically includes location information for the items or shipping containers in the planogram. In some embodiments, the delivery vehicle planogram also may include images or photographs of the delivery vehicle 104 in various stages of loading. In some configurations, the driver of the delivery vehicle can access the delivery vehicle planogram in a database to determine where a particular item is stored and which items are disposed around a particular item. Depending on how the information is routed in the system 100, the unloading plan may be communicated to the driver of the delivery vehicle or may be updated by the driver. The delivery vehicle planogram also may include information on the size, shape, and weight of the various shipping containers therein and intended destination for the products therein.

In addition to a delivery vehicle planogram, the system 100 also may create and employ unloading plans for the delivery vehicles 104, which may be based, in part, upon the delivery vehicle planogram. For example, the control circuit may generate the unloading plan by analyzing the delivery vehicle planogram and factors such as, for example, assigned priorities of the shipping containers, work required to unload the shipping containers based on the weight and size of the particular shipping container, safety and stability of the delivery vehicle planogram and/or resulting changes thereto with removal of one or more of the shipping containers. As used herein, the assigned priorities of the shipping containers are assessed according to identified needs of a retail facility or customer, organization of the delivery vehicle and a floor plan of the retail facility. In this manner, if a customer has requested immediate delivery of an item at a retail facility, it can be assigned a high priority such that it will be promptly removed from the delivery vehicle upon arrival at the retail store 152 and possibly routed to a customer service area for immediate pick-up.

In such a configuration, the control circuit 102 is configured to send instructions to the associate user wearing the eyeglass frames 14 to unload a particular one of the shipping containers 110 on the delivery vehicle 104 according to an unloading plan, which may be saved in the delivery and/or routing database similar to the delivery vehicle planogram, and provided to the associate user at the retail store 152 via the eyeglass frames 14. Further, the associate user 126, via the eyeglass frames 14, generally scans the shipping container and/or product RFID tags 132 and provides that information to the control circuit 102. In this manner, the control circuit 102 receives scanned information from the RFID tag reader 56 of the eyeglass frames 14 and can confirm the identification of the particular shipping container 110 with the delivery vehicle planogram (or update accordingly). In addition, the control circuit 102 may send instructions to the user wearing the eyeglass frames 14 regarding placement of the shipping containers 110, which may include a location outside of the delivery vehicle or in circumstances where immediate access to an important shipping container is block, the shipping containers with lower assigned priorities may merely be moved out of the way and not necessarily out of the delivery vehicle. Upon placement of a particular shipping container, the control circuit may confirm the proper location of the shipping container (such as via the wearable device 12) and typically updates the database 106 regrading an unload location of the particular shipping container upon removal thereof from the delivery vehicle 104.

As used herein, an unload location for shipping containers 110 at the retail store 152 include, for example, a final destination (such as a floor location 148 that is typically accessible by the purchasing public), an intermediate destination (such as an unpacking location 144 where the shipping containers 110 may be unpacked and/or unwrapped before moving the products therein to the floor), or a dock destination (such as a docking location 146). In addition, the database also may note a product final store destination, which may be useful for products or shipping containers that are temporarily placed on the dock, but which are to be subsequently moved to a floor location. To that end, the control circuit 102 may send instructions to the user wearing the eyeglass frames 14, according to the unloading plan, regarding movement of at least one of the particular shipping container or the products therein.

In one illustrative approach, the control circuit 102 and/or the wearable devices 12 update the delivery vehicle planogram during the unloading process for a delivery vehicle 104. In some configurations, this provides a check on the process, such that the RFID tag readers may scan the delivery vehicle 104 (or portions thereof) to ensure that the current state of the delivery vehicle 104 correlates with the delivery vehicle planogram saved in the database 106. Further, the control circuit 102 or the wearable devices 12 may update the unloading plan as the shipping containers 110 are unloaded from the delivery vehicle 104, which may occur in response to the planogram being updated. In one exemplary configuration, the system 100 also may update the unloading plan in response to a change to retail facility needs, a change of customer needs, a change in available staffing, and/or the updated delivery vehicle planogram. Furthermore, the control circuit 102 and/or the wearable devices 12 may adjust the unloading plan to avoid unstable inventory shipment and/or to match unloading resources to the effort required to unload a particular shipping container 110.

As noted above, the unload location can include a final, immediate, or a dock destination. Accordingly, the unloading plan may instruct delivery of the shipping containers to a facility final destination, an intermediary destination, or a dock destination. Further, the unloading plan may instruct the associate user to break down or remove packaging materials from the delivery vehicle or a dock area.

To illustrate how the wearable devices 12 of the system 100 may be employed to process incoming and outgoing shipments, facilitate distribution and/or delivery of products, and streamline work flow, illustrative methods are described herein. In one exemplary embodiment, a method 200 is provided herein for distributing retail products or managing a work flow or supply chain of products. By one approach, the method 200 includes unloading 202 bundles from a shipment, via an autonomous robot or a user with eyeglass frames having an RFID tag reader therein and scanning 204 bundles of items with RFID tags associated therewith as the bundles are unloaded from a shipment. The method also includes accessing 206 a database with inventory records of bundles of items associated with a shipment, bundle RFID tags, bundle locations, and item destinations. In step 208, the method may provide instructions (to an associate unloading the shipment via the eyeglass frames or to the autonomous robot) regarding placement of the bundles of items unloaded from the shipment. In addition, the method includes depositing 210 the bundles and/or items from the bundles in a packing location.

In operation at the packing location, the method includes packing 212 shipping containers with product(s) from one or more bundles of items for shipment to a retail facility or a customer based on item destinations in the database. As noted above, the shipping containers may have a container RFID tag and/or a product RFID tag associated therewith.

In some configurations, the method 200 includes providing instructions 213 to an associate unloading the shipment via the eyeglass frames or to the autonomous robot, regarding placement of the shipping containers when loading (or unloading) a delivery vehicle. Further, the method 200 includes loading 214 a delivery vehicle with packed shipping containers. As the delivery vehicle is being loaded, the method typically includes scanning 216 the container and/or product RFID tags. With this information, the method includes updating 218 the database to associate the delivery vehicle, packaged shipping containers, container and/or product RFID tags, the products therein, and a location of the shipping container within the delivery vehicle. This also may be correlated with other information in the database, such as for, example, order or customer information, which may be found in the customer database 116 delivery and/or routing database 114, and/or order database 122, for example.

In one illustrative approach, an item location may be updated 220 in the database 106 based upon movement of the delivery vehicle. This may occur, for example, upon the departure of a delivery vehicle, upon receipt of a location update for a delivery vehicle (i.e., an updated delivery vehicle location), or upon the arrival of the delivery vehicle at the retail facility or customer location. With this information, the method may include sending 222 shipment notifications to recipient retail facilities or customers based upon updated item locations in the database. By another approach, the movements of the shipping containers (such as within the delivery vehicle) are monitored 224 by RFID tag readers, which may be disposed in the vehicle.

In another aspect, the method 200 also may create 226 a delivery vehicle planogram that indicates where particular shipping containers (and the products therein) are located within a delivery vehicle. This can be particularly useful for the retail facilities receiving the delivery vehicle or for delivery agents who are unloading shipping containers at individual customer's homes or delivery locations. By one approach, the delivery vehicle planogram can be updated as additional shipping containers are loaded onto the delivery vehicle and updated when the shipping containers therein are moved within the delivery vehicle or removed from the delivery vehicle.

In another exemplary embodiment, a method 400 is provided herein for unloading and routing shipping containers and products at a retail store or further managing a work flow or supply chain of products. By one approach, the method 400 includes loading 402 shipping containers, such as shipping containers 110, onto a delivery vehicle and scanning RFID tags associated with the shipping containers (such as RFID tags attached to the shipping container itself or the product(s) therein) and associating therewith a location of the shipping containers within the delivery vehicle to generate a delivery vehicle planogram. In one approach, the scanning of the RFID tags and associating of the location of the shipping container within the delivery vehicle may occur via wearable smart devices, such as the eyeglass frames 14 discussed above. In step, 404, the method may include generating an unloading plan for removing the shipping containers from the delivery vehicle. In this manner, the unloading process is orderly, organized, and efficient and may account for various factors such as, for example retail store or customer priorities. To that end, in step 406, the method may analyze a delivery vehicle planogram, assigned priorities of the shipping containers, the work required to unload particular shipping containers based on weight and size, and/or safety and stability concerns regarding the delivery vehicle to generate or update an unloading plan for a particular delivery vehicle.

In step 408, the movement of the shipping containers within the delivery vehicle may be monitored, such as, for example via onboard RFID tag readers disposed within the delivery vehicle. The movement may be tracked during loading, unloading, and or transit of the delivery vehicle.

In some embodiments, the method 400 includes updating the delivery vehicle planogram and/or unloading plan at various points, such as, for example, during transit, loading, and/or unloading of the delivery vehicle. In one illustrative approach, the method includes updating 410 the delivery vehicle planogram and the unloading plan during the unloading of the delivery vehicle. In some configurations, the method includes updating 416 the delivery vehicle unloading plan (which may occur during unloading thereof) in response to a change in the needs of a retail facility (e.g., the floor of a retail store not having any of a particular retail product thereon), a change in the needs of a customer (e.g., if a customer has requested immediate delivery of an item and is waiting at the store for its arrival), a change in available staffing (e.g., if the manpower or equipment required to move certain bundles or pallets from the delivery vehicle is unavailable, the unloading plan may be updated to reschedule the unloading plan), to avoid unstable shipments or shipping containers, and/or the updated delivery vehicle planogram.

In operation at the retail store, the method instructs 412 a user with eyeglass frames (or, in some embodiments, an autonomous robot) to unload 414 a particular one of the shipping containers on the delivery vehicle according to the unloading plan. In step 418, the method includes scanning container and/or product RFID tags while unloading the delivery vehicle. The scanning of the RFID tags inside the delivery vehicle may occur via the eyeglass frames and may occur before, during, or after the user has grasped the particular shipping container.

In one illustrative approach, the eyeglass frames instruct a wearer to move certain shipping containers blocking access to a particular shipping container and then may instruct the wearer to grab or pick the particular shipping container and unload 414 the particular shipping container according to the unloading plan, which may include instructing 420 the user regarding placement of the particular shipping container outside of the delivery vehicle. For example, the user may be instructed to deliver a shipping container to a final destination (such as on the floor of a retail store), an intermediate destination (such as an unpacking location) or a dock destination. In response to the movement and unloading of the shipping container, the database, which may include the delivery vehicle planogram, is updated 422 accordingly. Specifically, the method includes updating the database regarding an unload location of the particular shipping container upon removal thereof from the delivery vehicle, which may include, for example, a final destination, an intermediate destination, or a dock destination.

To facilitate a safe and orderly unloading of the delivery vehicle, the method may include instructing 424 the user (via the eyeglass frames) to break down and/or remove packaging materials from the delivery vehicle, docking area, and/or unpacking area.

Figure 6:
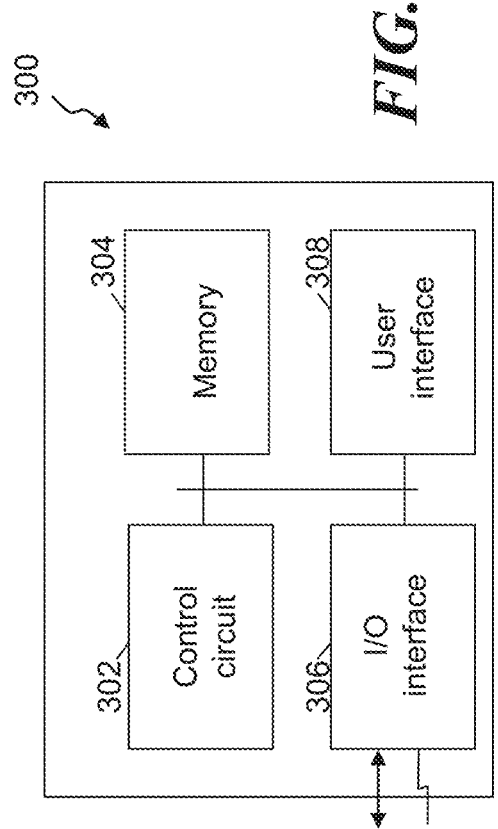
FIG. 6 illustrates an exemplary system for use in implementing systems, apparatuses, devices, methods, techniques, and the like for delivering products to customers in accordance with some embodiments.

The methods, techniques, systems, devices, services, servers, sources and the like described herein may be utilized, implemented and/or run on many different types of devices and/or systems. Referring to FIG. 6, there is illustrated a system 300 that may be used for any such implementations, in accordance with some embodiments. One or more components of the system 300 may be used to implement any system, apparatus or device mentioned above, or parts of such systems, apparatuses or devices, such as for example any of the above or below mentioned control circuits, electronic user devices, sensor(s), databases, parts thereof, and the like. However, the use of the system 300 or any portion thereof is, certainly not required.

By way of example, the system 300 may include one or more control circuits 302, memory 304, input/output (I/O) interface 306, and/or user interface 308. The control circuit 302 typically comprises one or more processors and/or microprocessors. The memory 304 stores the operational code or set of instructions that is executed by the control circuit 302 and/or processor to implement the functionality of the systems and devices described herein, parts thereof, and the like. In some embodiments, the memory 304 may also store some or all of particular data that may be needed to deliver retail products outside of a retail facility.

It is understood that the control circuit 302 and/or processor may be implemented as one or more processor devices as are well known in the art. Similarly, the memory 304 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 304 is shown as internal to the system 300; however, the memory 304 can be internal, external or a combination of internal and external memory. The system 300 also may include a database (not shown in FIG. 6) as internal, external, or a combination of internal and external to the system 300. Additionally, the system typically includes a power supply (not shown), which may be rechargeable, and/or it may receive power from an external source. While FIG. 6 illustrates the various components being coupled together via a bus, it is understood that the various components may actually be coupled to the control circuit 302 and/or one or more other components directly.

Generally, the control circuit 302 and/or electronic components of the system 300 can comprise fixed-purpose hard-wired platforms or can comprise a partially or wholly programmable platform. These architectural options are well known and understood in the art and require no further description here. The system and/or control circuit 302 can be configured (for example, by using corresponding programming as will be well understood by those skilled in the art) to carry out one or more of the steps, actions, and/or functions described herein. In some implementations, the control circuit 302 and the memory 304 may be integrated together, such as in a microcontroller, application specification integrated circuit, field programmable gate array or other such device, or may be separate devices coupled together.

The I/O interface 306 allows wired and/or wireless communication coupling of the system 300 to external components and/or or systems. Typically, the I/O interface 306 provides wired and/or wireless communication (e.g., Wi-Fi, Bluetooth, cellular, RF, and/or other such wireless communication), and may include any known wired and/or wireless interfacing device, circuit and/or connecting device, such as but not limited to one or more transmitter, receiver, transceiver, etc.

The user interface 310 may be used for user input and/or output display. For example, the user interface 310 may include any known input devices, such one or more buttons, knobs, selectors, switches, keys, touch input surfaces, audio input, and/or displays, etc. Additionally, the user interface 310 include one or more output display devices, such as lights, visual indicators, display screens, etc. to convey information to a user, such as but not limited to communication information, instructions regarding unloading of the delivery vehicle, status information, order information, delivery information, notifications, errors, conditions, and/or other such information. Similarly, the user interface 310 in some embodiments may include audio systems that can receive audio commands or requests verbally issued by a user, and/or output audio content, alerts and the like.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

The invention claimed is:

1. A system for tracking products in real-time and managing distribution of comprising:
   a database having an inventory record with bundles of items associated with a shipment, bundle RFID tag identifiers associated therewith, bundle locations, and item destinations;
   eyeglass frames wearable by a user, the frames having an electronic assembly mounted to the frames including a display device and a speaker and an RFID tag reader configured to scan the bundle RFID tags that are unloaded from the shipment by the user wearing the frames; and a control circuit in communication with the RFID tag readers and the database, the control circuit configured to:
   receive identifying information for one of the bundle RFID tags associated with one of the bundles of items via the RFID tag readers;
   update the database with an item location upon receipt of the bundle of items at a distribution center and the identifying information for the one of the bundle RFID tags by the control circuit;
   upon packing a shipping container with products from one or more of the bundles of items for delivery to at least one of a retail facility or a customer, associate the container, via a container RFID tag or a product RFID tag, with the products packed into the shipping container;

provide instructions to the user, via the speaker of the frames, regarding placement and intended location of the shipping containers within a delivery vehicle as the shipping containers are loaded into the delivery vehicle; and update the database to associate the delivery vehicle with the shipping containers loaded therein, the container or product RFID tags associated with the shipping containers loaded therein, and the products packed therein, upon receipt of a scan of the RFID tags as the shipping containers are loaded into the delivery vehicle.

2. The system of claim 1 wherein the frames having a pair of temple arm members configured to rest on ears of the user and a front support having a bridge portion configured to rest on a nose of the user who is loading or unloading the delivery vehicle, the frames communicatively coupled to the control circuit.

3. The system of claim 1 wherein the delivery vehicle includes one or more RFID tag readers incorporated therein and the RFID tag readers being disposed in at least one of: a vehicle ceiling, a vehicle floor, a vehicle door, a vehicle frame, or a vehicle load and unload point.

4. The system of claim 1 wherein the frames, in communication with the control circuit, update the database upon loading of the containers onto the delivery vehicle.

5. The system of claim 1 further comprising a secondary RFID tag reader at a container packing location, the secondary RFID tag reader configured to scan at least one of the RFID tags on the products being deposited into the shipping containers and the control circuit is further configured to update the database upon receipt of a reading that one or more of the products are deposited into a particular shipping container for shipment thereof.

6. The system of claim 5 further comprising RFID shielding at the container packing location.

7. The system of claim 5 wherein the container packing location is where the bundles of items are deposited after removal from the shipment and where the products from the bundle of items are placed into the shipping containers having the container RFID tag incorporated therewith.

8. The system of claim 1 wherein the system further comprises both the container RFID tags and product RFID tags and the database further includes a product RFID tag identifier and a container RFID tag identifier associated with the shipping container.

9. The system of claim 1 wherein the RFID tag associated with at least one of the shipping container or the products therein is attached to at least one of the shipping container or product packaging.

10. A system for tracking products in real-time comprising:
a database having an inventory record with bundles of items associated with a shipment, bundle RFID tag identifiers associated therewith, bundle locations, and item destinations;
an autonomous robot having an RFID tag reader configured to scan the bundle RFID tags that are unloaded from the shipment by the autonomous robot; and
a control circuit in communication with the RFID tag readers and the database, the control circuit configured to:
receive identifying information for one of the bundle RFID tags associated with one of the bundles of items via the RFID tag readers;
update the database with an item location upon receipt of the bundle of items at a distribution center and the identifying information for the one of the bundle RFID tags by the control circuit;
upon packing a shipping container with products from one or more of the bundles of items for delivery to at least one of a retail facility or a customer, associate the container, via a container RFID tag or a product RFID tag, with the products packed into the shipping container;
provide instructions to the autonomous robot regarding placement and intended location of the shipping containers within a delivery vehicle as the shipping containers are being loaded thereon; and
update the database to associate the delivery vehicle with the shipping containers loaded therein, the container or product RFID tags associated with the shipping containers loaded therein, and the products packed therein, upon receipt of a scan of the RFID tags as the shipping containers are loaded into the delivery vehicle.

11. The system of claim 10 wherein the autonomous robot is configured to assist with unloading the shipment and loading of the delivery vehicle, the autonomous robot being communicatively coupled to the control circuit.

12. The system of claim 10 wherein the delivery vehicle includes one or more RFID tag readers incorporated therein and the RFID tag readers being disposed in at least one of: a vehicle ceiling, a vehicle floor, a vehicle door, a vehicle frame, or a vehicle load and unload point.

13. The system of claim 10 wherein the autonomous robot and the control circuit, which are in communication with one another, update the database upon loading of the containers onto the delivery vehicle.

14. The system of claim 10 further comprising a secondary RFID tag reader at a container packing location, the secondary RFID tag reader configured to scan at least one of the RFID tags on the products being deposited into the shipping containers or the shipping containers and the control circuit is further configured to update the database upon receipt of a reading that one or more of the products are deposited into a particular shipping containers for shipment thereof.

15. The system of claim 14 further comprising RFID shielding at the container packing location.

16. The system of claim 14 wherein the container packing location is where the bundles of items are deposited after removal from the shipment and where the products from the bundle of items are placed into the shipping containers having the container RFID tag incorporated therewith.

17. The system of claim 10 wherein the system further comprises both the container RFID tags and product RFID tags and the database further includes a product RFID tag identifier and a container RFID tag identifier associated with the shipping container.

18. The system of claim 10 wherein the RFID tag associated with at least one of the shipping container or the products therein is attached to at least one of the shipping container or product packaging.

19. A method for tracking products comprising:
unloading bundles of items from a shipment, via an autonomous robot or a user with eye frames having an electronic assembly mounted thereto and each of the autonomous robot or the eye frames having an RFID tag reader incorporated therein, the bundles having bundle RFID tags associated therewith;
scanning the bundle RFID tags during the unloading of the bundles of items from the shipment;

accessing a database having an inventory record having the bundles of items associated with a shipment, the bundle RFID tags, bundle location, and item destinations;

depositing the items from the bundles in a packing location;

packing shipping containers with products from one or more of the bundles of items for shipment to at least one of a retail facility or a customer based on the item destinations in the database, the shipping containers having at least one of a container RFID tag or a product RFID tag associated therewith;

loading a delivery vehicle with the packed shipping containers;

scanning the container or product RFID tags upon loading of the packed shipping containers into the delivery vehicle; and updating the database to associate the delivery vehicle, the packed shipping containers, the container or product RFID tags, and the products therein;

wherein the user with the eye frames receives instructions from the eye frames, which has a control circuit, a transceiver, and a hands-free user input in the electronic assembly, regarding where to place the bundles of items when unloading the shipment.

20. The method of claim 19 further comprising updating an item location in the database upon detection of at least one of a departure of the delivery vehicle, an update on the delivery vehicle location, or arrival of the delivery vehicle at the retail facility or a customer location.

21. The method of claim 20 further comprising sending one or more shipment notifications to a recipient physical retail facility or the customer based upon the item location in the database.

22. The method of claim 19 further comprising monitoring movement of the packed shipping containers in the delivery vehicle via one or more RFID tag readers disposed in the delivery vehicle.

23. The method of claim 19 wherein the user with the eye frames receives instructions from the eye frames, which has a control circuit, a transceiver, and a hands-free user input in the electronic assembly, regarding where to place the shipping containers when loading the delivery vehicles.

24. A method for tracking products comprising:

unloading bundles of items from a shipment, via an autonomous robot or a user with eye frames having an electronic assembly mounted thereto and each of the autonomous robot or the eye frames having an RFID tag reader incorporated therein, the bundles having bundle RFID tags associated therewith;

scanning the bundle RFID tags during the unloading of the bundles of items from the shipment;

accessing a database having an inventory record having the bundles of items associated with a shipment, the bundle RFID tags, bundle location, and item destinations;

depositing the items from the bundles in a packing location;

packing shipping containers with products from one or more of the bundles of items for shipment to at least one of a retail facility or a customer based on the item destinations in the database, the shipping containers having at least one of a container RFID tag or a product RFID tag associated therewith;

loading a delivery vehicle with the packed shipping containers;

scanning the container or product RFID tags upon loading of the packed shipping containers into the delivery vehicle; and updating the database to associate the delivery vehicle, the packed shipping containers, the container or product RFID tags, and the products therein;

wherein the user with the eye frames receives instructions from the eye frames, which has a control circuit, a transceiver, and a hands-free user input in the electronic assembly, regarding where to place the shipping containers when loading the delivery vehicles.

25. The method of claim 24 further comprising updating an item location in the database upon detection of at least one of a departure of the delivery vehicle, an update on the delivery vehicle location, or arrival of the delivery vehicle at the retail facility or a customer location.

26. The method of claim 25 further comprising sending one or more shipment notifications to a recipient physical retail facility or the customer based upon the item location in the database.

27. The method of claim 24 further comprising monitoring movement of the packed shipping containers in the delivery vehicle via one or more RFID tag readers disposed in the delivery vehicle.

* * * * *